(12) United States Patent
Beeman et al.

(10) Patent No.: US 6,438,802 B1
(45) Date of Patent: Aug. 27, 2002

(54) LOCKING MECHANISM AND METHOD FOR SECURELY FASTENING RESILIENT CORDS AND TUBING

(76) Inventors: Randolph Scott Beeman, 2215 Cork Oak St., Sarasota, FL (US) 34232; Joseph Frank Manzella, 7220 8th Ave., NW, Bradenton, FL (US) 34209

( * ) Notice: Subject to any disclaimer, the term of this patent is extended or adjusted under 35 U.S.C. 154(b) by 0 days.

(21) Appl. No.: 09/876,656

(22) Filed: Jun. 7, 2001

(51) Int. Cl.[7] ............................................... F16G 11/06
(52) U.S. Cl. ...................................................... 24/135 R
(58) Field of Search ............................. 24/135 R, 135 N, 24/115 R; 406/391; 439/781, 782, 804; 248/68.1

(56) References Cited

U.S. PATENT DOCUMENTS

| | | | |
|---|---|---|---|
| 706,393 A | * | 8/1902 | Darling |
| 832,595 A | * | 10/1906 | Cook |
| 1,640,183 A | * | 8/1927 | Denis |
| 4,143,446 A | * | 3/1979 | Down |
| 4,427,253 A | * | 1/1984 | Smith et al. |
| 5,136,756 A | * | 8/1992 | Krauss |
| 5,283,930 A | * | 2/1994 | Krauss |
| 6,044,527 A | * | 4/2000 | Ishida et al. |

FOREIGN PATENT DOCUMENTS

JP 10-331921 * 12/1998

* cited by examiner

*Primary Examiner*—James R. Brittain
(74) *Attorney, Agent, or Firm*—Dorothy S. Morse

(57) ABSTRACT

A two-part locking mechanism, and method of use, with each clamping member therein having a plurality of channels, and each channel having an interior hollow space and at least one ridge with a plurality of angled teeth therebetween, whereby when the clamping members are placed around the ends of resilient cords or tubing, and are further secured tightly to one another with threaded fasteners, the resilient cords or tubing become fixed firmly and remain therebetween even when subjected to sudden and substantial forces. Applications may include, but are not limited to, use in fixing two pieces of resilient tubing or cord in working relation to one another so that one is formed into a loop for use as a handle. When cords or tubing are thus secured, they can be used for anchoring an animal, tying down a trailer load, or stabilizing the frame for a tarp or tent.

20 Claims, 4 Drawing Sheets

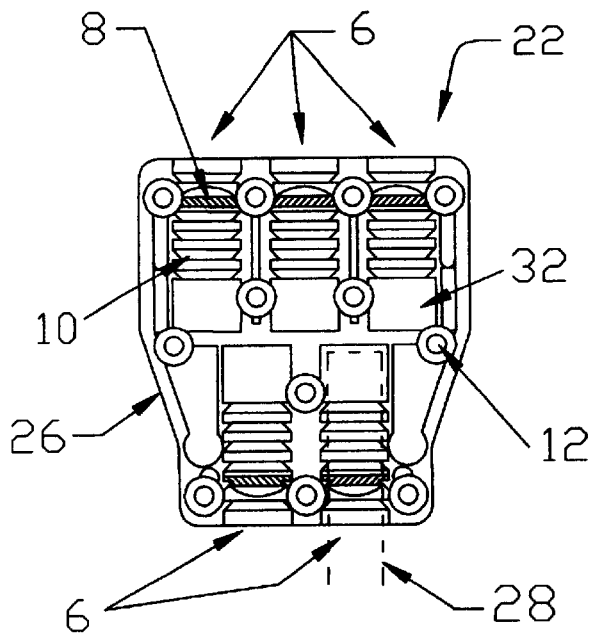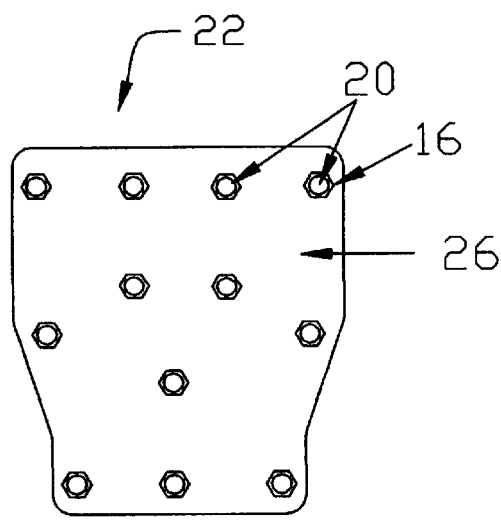
FIGURE 3A  FIGURE 3B
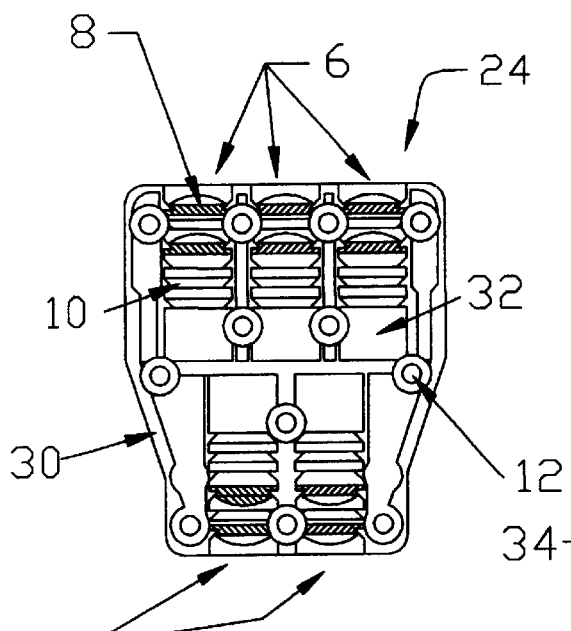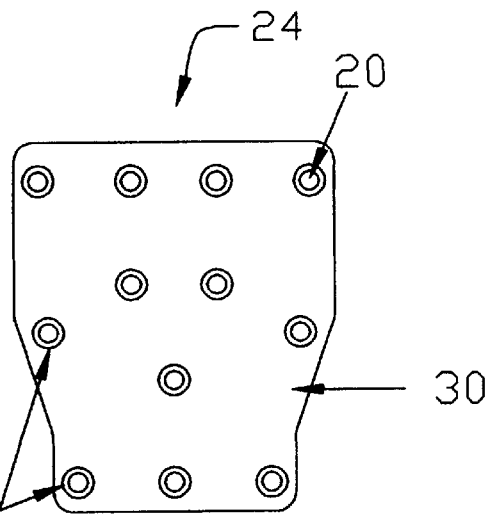
FIGURE 4A  FIGURE 4B

LOCKING MECHANISM AND METHOD FOR SECURELY FASTENING RESILIENT CORDS AND TUBING

BACKGROUND—FIELD OF INVENTION

This invention relates to clamping devices used for securing the ends of resilient tubing and cords in fixed relation to one another, specifically to a two-part locking mechanism, and a method for its use, wherein both clamping members in each locking mechanism have a unitary molded construction and a plurality of channels, and each channel has an open exterior end, at least one ridge adjacent to the open exterior end, an interior hollow space, and a plurality of angled teeth positioned between the hollow space and the innermost ridge. The channels in each clamping member are configured to align with a different one of the channels in a paired clamping member so that when the two clamping members in a pair are joined together, the opposed channels each form an enclosed tubular passage within which the end of one piece of resilient tubing or cord can be tightly secured. The interior hollow spaces are also aligned, with each pair of opposing hollow spaces forming an interior cavity into which the blunt tip of the cord or tubing is positioned. In contrast, the angled teeth and ridges in each tubular passage are offset from one another to produce a zigzag positioning of any cord or tubing placed between them that substantially fills the passage. Thus, when a pair of clamping members is positioned around the ends of resilient tubing or cords, and the two clamping members in the pair are joined together by threaded fasteners, the ends of the tubing and cords are squeezed by the opposed clamping members to become firmly secured against the teeth and ridges therein, whereby each is able to remain securely fixed within its respective tubular passage even when subjected to sudden and substantial forces, such as that from a strong gust of wind or a lunging animal. Applications may include, but are not limited to, the three-way connection of three pieces of resilient tubing or cords so that one is permitted to extend in an opposite direction from the other two, the five-way connection of five pieces of resilient tubing or cords so that three are permitted to extend in an opposite direction from the other two, and the three-way connection of the ends of two pieces of resilient tubing or cord so that one cord or piece of tubing can be formed into a looped configuration and provide a handle for use with the other. In addition, the present invention provides many other applications. When the channels of the present invention are specifically configured for such purpose during manufacture, the present invention would be able to easily and promptly join pieces of resilient tubing and cords of dissimilar size. The present invention is also suitable for joining resilient cords and tubing made from different materials the composition of which might otherwise make then difficult to join. The present invention also provides a compact, neat, efficient, and aesthetically appealing means for cord or tubing connection, and further provides the advantage of easy and prompt cord or tubing replacement when exchange is periodically anticipated as a result of rapid wear or changing need.

BACKGROUND—DESCRIPTION OF PRIOR ART

When a piece of hose is damaged or cut, such as a garden hose, the damaged section or sections can be removed, with the remaining segments reconnected with reliable coupling devices that can easily be used to re-establish leak-proof fluid communication within the hose. However, when it is desired to temporarily join two or more pieces of rope, other resilient cord, or flexible tubing for any one of a variety of reasons, such as to stably position a tarp or large tent, tie down objects on a trailer or in the back of a pick-up truck to prevent a shifting load, or create a device for anchoring or walking one or more animals, the options for easy, prompt, efficient, readily reproduced, and non-slip connection are limited, particularly when the cords or tubing would be subjected to sudden and substantial forces, such as those resulting from strong gusty winds or a lunging animal.

For example, when a person sets up a tarp to provide shade or shelter from inclement weather, elongated poles are often used to provide a frame over which the tarp will be stretched. Eyelets near the perimeter of the tarp can be used to attach the tarp to the frame. However, the frame and tarp combination will not withstand substantial wind gusts unless parts of the frame are further secured to the ground or nearby stationary objects. Non-stretchable, resilient rope or cord is often used for this purpose. Unless the person attaching the cords is an expert in tying knots, the connections made are usually bulky, look unsightly, make inefficient use of the available rope or cord, and often become prematurely loosened, particularly when the tarp is subjected to sudden and substantial gusts of wind. Also, since rope and other resilient cords are sold in precut lengths, and they almost always need to be further cut into smaller lengths for use, short remnant pieces are often left over and remain unused. The present invention would provide a compact, promptly attached and removed locking mechanism that could be used for the temporary non-slip joining of rope and cords employed to secure a tarp or large tent against strong winds. At least four corner connections would typically be required to anchor a rectangular frame, with two of the present invention locking devices being used for each of the anchoring connections. If the embodiment of the present invention providing a three-way connection is used, the ends of a short cord, even a remnant cord, could be connected into the two adjacent tubular passages on one end of the locking mechanism to form a loop extending around a raised portion of the frame, with the end of an elongated cord or piece of rope connected into the single tubular passage on the locking mechanism's opposite end. A second locking mechanism and a second short cord would similarly create a second loop on the other end of the elongated cord, with the second loop extending through or around a ground anchor, cleat, fence post, or handle of a nearby object that is sufficiently heavy to resist movement by the anticipated wind gusts. Since the ends of each cord or rope are secured within the clamping member channels, no surplus cord would be exposed, providing a neater and more esthetically appealing appearance, as well as a safer environment around the frame with no surplus cord over which people could trip or become entangled. The locking mechanism of the present invention would also provide an efficient connection means, which effectively uses short remnant pieces of cord or rope that would otherwise be left over or discarded. Since the ridges and angled teeth in each channel of the present invention would securely clamp onto the end of the piece of cord inserted therein, the ends of each cord connected to the present invention would remain in fixed relation to the others until deliberately released. Further, the time required for attachment and removal of the present invention would be comparable to that required for tying and untying a tightly secured knot.

Many other common applications of ropes, resilient cords, and flexible tubing require joining of two or more pieces prior to use. Often a rope needed for securing a load on a trailer, or in the back of a pick-up truck, is too short and must be connected to another rope, cord, or piece of tubing for effective use. Animals frequently need to be temporarily tethered. If a leash is unavailable, or the available leash is too short for the intended purpose, several lengths of rope, or a leash and a rope, must be temporarily joined together to accomplish the task. Sports nets are often set up in a back yard for an afternoon, or a weekend, which need to be secured against aggressive players, contact with racquets, and the effects of gusty winds. Being able to form a stable loop in one end of at least one of the ropes, cords, or tubing used would facilitate such connection, particularly when the selection of ropes, cord and tubing available are dissimilar in size or made from different materials. Although knot tying is a basic seamanship skill familiar to many, and would provide adequate rope or cord connection for most of the applications mentioned above, the vast majority of people have not learned to effectively tie even the simplest of knots. Further, even when a secure knot is tied in a piece of resilient tubing, particularly when it also has elastic properties, the knot will only temporarily remain in place, often becoming loosened or completely undone when the tubing is removed from a load-bearing function, requiring that the knot be retied prior to a subsequent use. In addition, when a person attempts to secure a piece of resilient tubing or cord to another piece of resilient tubing or cord made from different materials, one of them is often more stretchable than the other making any knot used for such a connection easily loosened, sometimes after a short period of time. The present invention locking mechanism solves the above problems by providing a means for securely fixing the end of any type of flexible tubing or cord to itself or other cords made from the same or different materials, and wherein the ends of any tubing or cords substantially filling the tubular passages within the clamping members of each locking mechanism stay connected therein until deliberately released. Also, the present invention locking mechanism has a compact design, allows efficient use of available cord and tubing whether similar in composition and dimension or not, is durable, reusable, aesthetically pleasing, easily manufactured, can be promptly and easily put into use and removed from the ends of pieces of resilient tubing and cords, and can be manufactured for an inexpensive unit cost. There is no known locking mechanism for joining two or more pieces of resilient cord, rope, or tubing to one another, or for forming such pieces into a loop, that has all of the advantages of the present invention.

SUMMARY OF INVENTION—OBJECTS AND ADVANTAGES

The primary object of this invention is to provide a reusable locking mechanism of simple construction for securely fixing the end of any type of resilient tubing, rope, or cord to itself or other pieces of tubing, rope, or cords made from the same or different materials, and wherein the end of each piece of tubing, rope, or cord that substantially fills a tubular passage within such a locking mechanism stays secured therein even when subjected to sudden and substantial forces, such as that provided by strong wind gusts or a lunging animal. It is also an object of this invention to provide a locking mechanism that can be promptly attached and removed, and does not leave exposed lengths of surplus cord or tubing hanging from an installed cord or piece of tubing after its connection. A further object of this invention is to provide a locking mechanism with a design adaptable for joining two or more similar pieces of resilient tubing or cords to one another in varying combinations, as well as to cords or tubing having different diameter dimensions. It is also an object of this invention to provide a locking mechanism that will even be effective in joining a resilient cord or piece of tubing to another resilient cord or piece of tubing made from dissimilar materials. A further object of this invention is to provide a locking mechanism that is non-corroding, durable in construction, and easy to use. It is also an object of this invention to provide a locking mechanism that has a compact configuration, a simple aesthetically appealing design, and is easily manufactured for an inexpensive unit cost.

As described herein, properly manufactured and used, the two-part present invention locking mechanism would act as a clamping device for joining the ends of two or more pieces of resilient tubing, rope, or cord, and securing those ends in a fixed relation to one another even when they are subjected to sudden and substantial forces, such as that provided by a strong gust of wind, movement of a vehicle or trailer over uneven terrain, or a lunging animal. The two-piece molded construction, with each clamping member in a pair completely separable from the other and attached thereto during use with a plurality of threaded fasteners, makes it easily reusable. The amount of time needed for tightening the fasteners to secure cords between the two clamping members, and loosening them again to release the cords, would be comparable to that needed for tying and untying a securely fixed knot. The compact design of the locking mechanism allows for easy manipulation and use, with the two clamping members readily assembled in the palm of one hand or on a flat surface. The compact design and the lightweight plastic materials of the clamping members also assist in prompt cord connection and release, and make the locking mechanism easily stored between uses. Fasteners can remain attached to the clamping members during storage, or be stored separately from the clamping members, depending upon the preference of the user. Since the blunt tips of the rope, other resilient cords, or flexible pieces of tubing are positioned between the two clamping members within interior cavities, there are no unsightly loose ends or surplus cord to contend with which can create a safety hazard in some applications. Each clamping member has a simple construction, with a plurality of channels, one for each end of rope, cord, or tubing that needs to be secured in end-to-end working relation with other pieces of rope, tubing, or cord. Channels in the opposing clamping members in each pair are aligned to form enclosed tubular passages. Opposing hollow spaces in the interior ends of paired channels are also aligned to form a cavity for receipt of the blunt tip of a piece of tubing, cord, or rope. However, the angled teeth and ridges in each channel, which line the tubular passages, are not aligned and cause any piece of rope, cord, or tubing placed in the passage and substantially filling it to be crimped into a zigzag configuration which lessens the opportunity for unexpected rope, cord, or tubing withdrawal. Although it is anticipated for the most commonly used embodiment of the present invention locking mechanism to provide a three-way cord, rope, or tubing connection, with two approximately parallel channels extending through one end of the paired clamping devices and one channel extending in the opposite direction through the opposed end thereof, locking mechanisms having other channel combinations are also considered within the scope of the present invention, to include but not be limited to a four-way connection consisting of three approximately parallel channels in one direction and a single channel extending in the opposite direction; a four-way connection consisting of two approximately parallel channels in one direction and two channels extending in the opposite direction; and a five-way connection consisting of three approximately parallel channels in one direction and two channels extending in the opposite direction. Further, all of the pieces of rope, cord and tubing secured within the same pair of clamping devices do not need to have the same diameter dimension. During manufacture, one or more of the tubular passages in a pair of clamping devices can be made larger than the other tubular passages. The tapered octagonal design of the locking mechanism easily accommodates small changes in channel width, with the tapered end capable of being narrowed or fully expanded into a rectangular configuration, as required by the intended application. Optimally, the tubular passages formed by the clamping members in each pair would be slightly smaller than the outside diameter dimension of the resilient rope, cord, or tubing contemplated for use therewith, so that the rope, cord, or tubing substantially fills its respective passage during use and when the threaded fasteners are tightened to firmly connect the two clamping members around the pieces of cord, rope, or tubing, the clamping members will squeeze the cord, rope, or tubing and force it into a zigzag configuration firmly between the staggered ridges and angled teeth. Since each piece of cord, rope, or tubing is positioned within a separate tubular passage and the secure connection of each relative to the others depends only upon the clamping members and not neighboring cords, rope, or tubing, the type of material from which an adjacent piece of cord, rope, or tubing is made would be inconsequential to the successful connection of any other piece of cord, rope, or tubing secured within a single locking mechanism. Also, the rigid, high-impact strength plastic materials from which the clamping members of the locking mechanism would most commonly be made, including recycled plastics, would make the present invention non-corroding and durable, equally suited for extended or repeat use, and easily manufactured for an inexpensive unit cost.

The description herein provides preferred embodiments of the present invention, however, it should not be construed as limiting the scope of the locking mechanism invention. For example, variations can exist in the number of angled teeth and ridges used in each channel; the thickness of the angled teeth and ridges used; the number and size of the threaded fasteners used to connect the paired clamping members during use; and the diameter and overall length of the tubular passages formed by the opposing channels, in addition to other obvious variations not specifically shown and described herein that may be incorporated into the present invention. Thus the scope of the present invention should be determined by the appended claims and their legal equivalents, rather than being limited to the examples given.

BRIEF DESCRIPTION OF THE DRAWINGS

FIG. 3A is a front view of a second preferred embodiment of the present invention, showing the inside surface of a first clamping member in the two-part locking mechanism, the second embodiment being usable for five-way connection of resilient tubing, rope, or cords in end-to-end relation so that two cord, rope, or tubing connections are made from the same side of the locking mechanism and the remaining three connections are made from the opposite side thereof, the first clamping member having five channels, each channel having one ridge adjacent to its exterior end, an interior hollow space, and three angled teeth between the hollow space and the ridge, the first clamping member also having nine spaced-apart apertures near to its perimeter for attachment of threaded fasteners, and three similarly dimensioned apertures that are centrally located, with all apertures being positioned outside of the channels.

FIG. 3B is a front view of the outside surface of the first clamping member in the second preferred embodiment of the present invention locking mechanism, with the first clamping member having twelve hex nuts each attached to the threaded end of a different bolt, the hex nut and bolt combinations each aligned with a different one of the apertures shown in FIG. 3A.

FIG. 4A is a front view of the inside surface of the second clamping member in the second preferred embodiment of the present invention locking mechanism, with the second clamping member having five channels, each channel having two ridges adjacent to its exterior end, an interior hollow space, and two angled teeth between the hollow space and the innermost ridge, the second clamping member also having nine spaced-apart apertures near to its perimeter for attachment of threaded fasteners, and three similarly dimensioned apertures that are centrally located, with all apertures being positioned outside of the channels and each aligned with a different one of the apertures shown in FIG. 3A FIG. 4B is a front view of the outside surface of the second clamping member in the second preferred embodiment of the present invention clamp, with the second clamping member having twelve threaded bolts each aligned with a different one of the apertures shown in FIGS. 3A and 4A.

DETAILED DESCRIPTION OF PREFERRED EMBODIMENTS

Figure 1A:
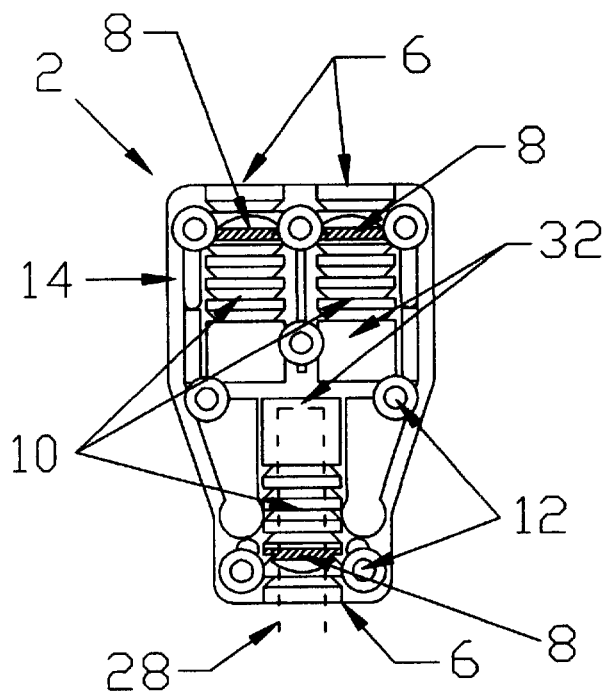
FIG. 1A is a front view of a first preferred embodiment of the present invention, showing the inside surface of a first clamping member in the two-part locking mechanism, the first embodiment being usable for three-way connection of resilient tubing, rope, or cords in end-to-end relation so that two cord, rope, or tubing connections are made from the same side of the locking mechanism and the third connection is made from the opposite side thereof, the first clamping member having three channels, each channel having one ridge adjacent to its exterior end, an interior hollow space, and three angled teeth between the hollow space and the ridge, the first clamping member also having seven spaced-apart apertures near to its perimeter for attachment of threaded fasteners, and one similarly dimensioned aperture that is centrally located, with all apertures being positioned outside of the channels.
Figure 1B:
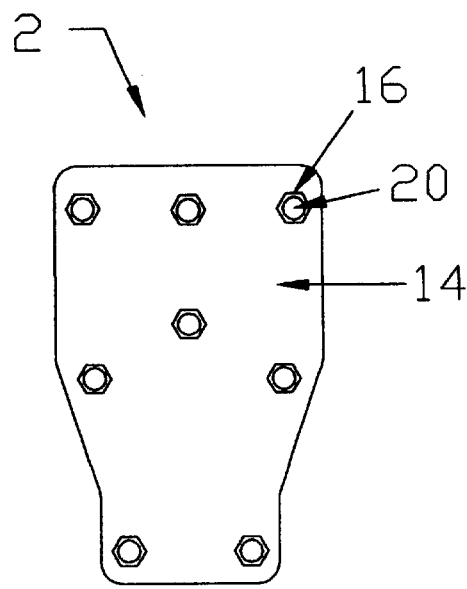
FIG. 1B is a front view of the outside surface of the first clamping member in the first preferred embodiment locking mechanism, with the first clamping member having eight hex nuts each attached to the threaded end of a different bolt, and the hex nut and bolt combinations each being aligned with a different one of the apertures shown in FIG. 1A.
Figure 2A:
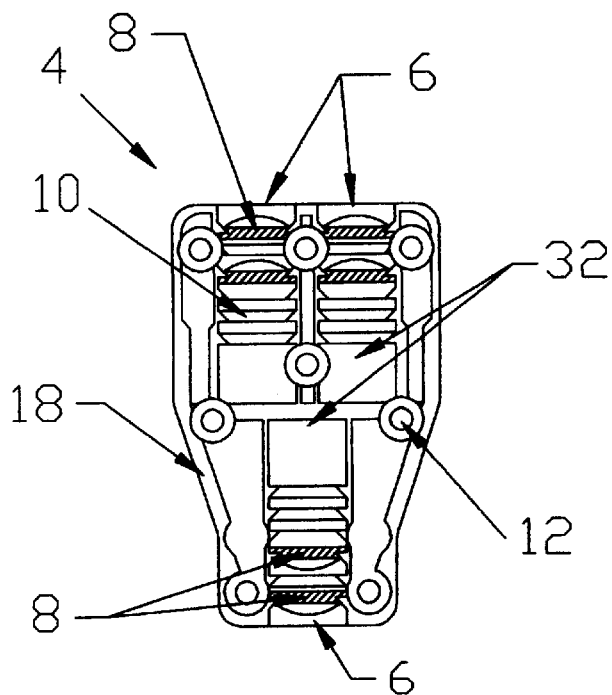
FIG. 2A is a front view of the inside surface of the second clamping member in the first preferred embodiment of the present invention locking mechanism, with the second clamping member having three channels, each channel having two ridges adjacent to its exterior end, an interior hollow space, and two angled teeth between the hollow space and the innermost ridge, the second clamping member also having seven spaced-apart apertures near to its perimeter of for attachment of threaded fasteners, and one similarly dimensioned aperture that is centrally located, with all apertures being positioned outside of the channels and each aligned with a different one of the apertures shown in FIG. 1A.
Figure 2B:
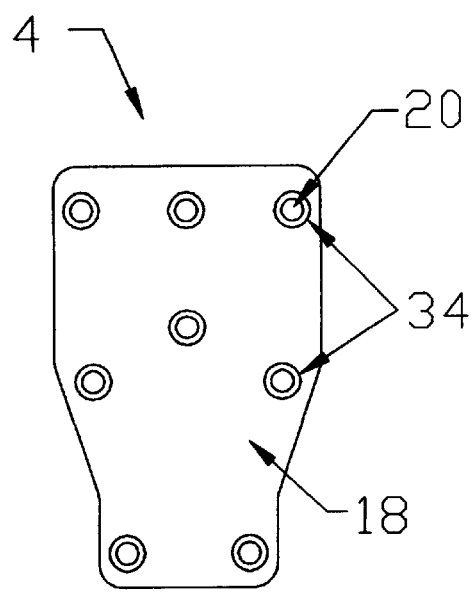
FIG. 2B is a front view of the outside surface of the second clamping member in the first preferred embodiment of the present invention locking mechanism, with the second clamping member having eight threaded bolts each aligned with a different one of the apertures shown in FIGS. 1A and 2A.
Figure 5:
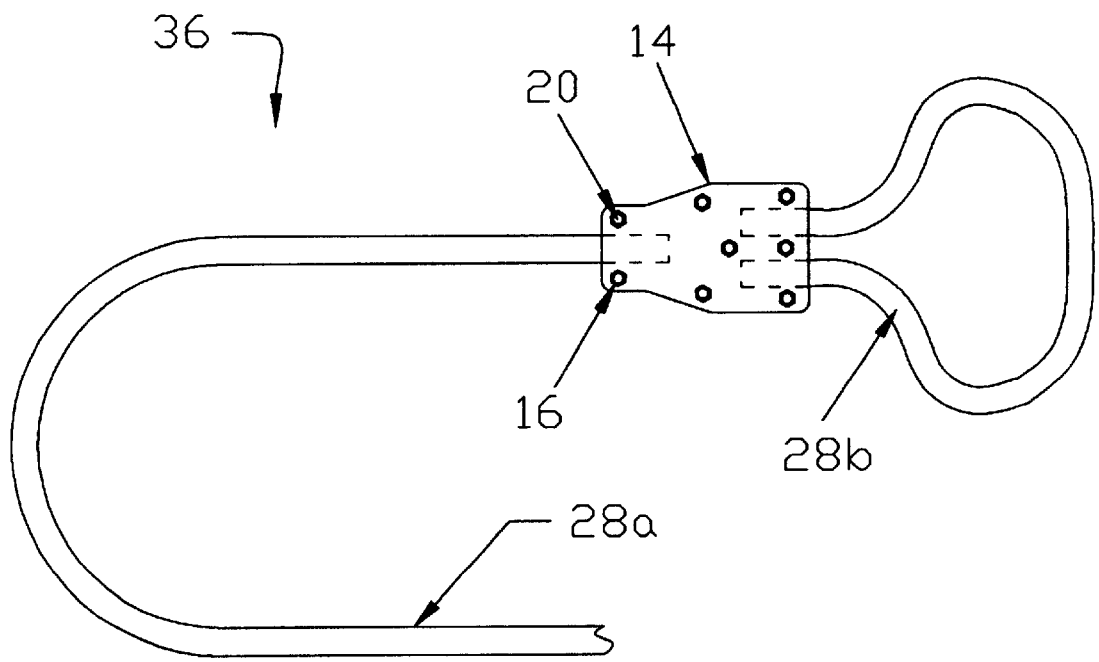
FIG. 5 is a top view of the first preferred embodiment of the present invention locking mechanism being used to securely connect two cords to one another, with one of the cords being formed into a loop.

FIGS. 1A, 1B, 2A, and 2B show a first preferred embodiment of the present invention locking mechanism, having a first clamping member 2 and an opposing second clamping member 4 used together for a three-way connection of resilient cords, rope, and pieces of tubing to one another, or to itself to form a loop, such as cord or tubing 28 shown in FIG. 1A and FIG. 3A, or pieces of cords, rope, or tubing 28a and 28b shown in FIG. 5. Although it is contemplated for the designation 'cords or tubing 28' in the ensuing description to include any type of flexible or resilient piece of rope, cord, heavy twine, rubber tubing or tubing made from synthetic materials, or other similar elongated or filamentous line that could be joined by the present invention, for simplicity of description, the words 'cord and tubing' will hereinafter be used with the number 28 in a representative capacity for the entire contemplated group. FIGS. 1A and 1B, respectively, show the inside and outside surfaces of first clamping member 2. FIGS. 2A and 2B, respectively, show the inside and outside surfaces of second clamping member 4. Although it is considered to be within the scope of the present invention for first clamping member 2 to be permanently connected to second clamping member 4, in the most preferred embodiments it is contemplated for first clamping member 2 to be completely separable from second clamping member 4. The threaded fasteners employed to connect first clamping member 2 to second clamping member 4 during use, such as bolts 20 and hex nuts 16, are not shown in a separate illustration as it is contemplated for commonly available fasteners to be used in most applications. Although in the first preferred embodiment it is contemplated for first clamping member 2 and second clamping member 4 to be comparable in size, nearly identical dimension of first clamping member 2 and second clamping member 4 is not critical as long as the two parts of the present invention locking mechanism can promptly and easily become securely fixed together to firmly hold each piece of cord or tubing 28 used therewith without slippage or sudden disconnection. FIG. 1A shows first clamping member 2 having a molded body 14 manufactured as a single unit, with three longitudinally extending channels 6 formed into the inside surface of molded body 14. Two of the channels 6 are upwardly extending, with the third channel 6 extending in an opposed downwardly extending direction. Broken lines in FIG. 1A show a piece of cord or tubing 28 within the downward extending channel 6 and in a near optimum position of use. Each channel 6 in FIG. 1A is shown to have three angled teeth 10, one ridge 8, and a interior hollow space 32, with the angled teeth 10 being positioned between interior hollow space 32 and ridge 8, interior hollow space 32 being within the interior end of channel 6, ridge 8 being near to the exterior end of channel 6, and the exterior end of channel 6 being open for extension of the cord or tubing 28 secured between angled teeth 10 and ridge 8 beyond channel 6. Angled teeth 10 are each configured to resist the withdrawal of cord or tubing 28 across ridge 8 and movement beyond the open exterior end of channel 6. FIG. 1A also shows seven apertures 12 in spaced-apart positions near to the perimeter of molded body 14, and one centrally positioned aperture 12 between the two upwardly extending channels 6. The exact positioning of the centrally positioned aperture 12 may vary from that shown, as long as the centrally positioned aperture 12 is not situated so as to interfere with the secure positioning of a piece of cord or tubing 28 within any channel 6. It can be seen in FIG. 1A that apertures 12 are positioned laterally on each side of each of the three ridges 8 to help the piece of cord or tubing 28 to remain within channel 6 under varying load conditions. The number of apertures 12 used is not critical, and more than eight apertures 12 could be used when appropriate to the intended application. However, the number of apertures 12 should not be unduly multiplied to add expense to the present invention without appropriate benefit. A number of apertures 12 less than eight could also be used for some applications, although use of less than eight apertures is generally not preferred when the cords or tubing inserted into channels 6, such as cords or tubing 28a and 28b shown in FIG. 5, would be subjected to varying load conditions. The number and length of channels 6, the number and width of angled teeth 10, and the number and width of ridges 8 used are also not critical, with the numbers, length, and widths all being adapted accordingly to suit the intended application. FIG. 1B shows the outer surface of molded body 14 having eight hex nuts 16 attached thereto and each secured to the end of a bolt 20. The hex nuts 16 are each located in a different position that corresponds to one of the apertures shown in FIG. 1A. Although the outer surface of molded body 14 can be made flat so that hex nuts 16 remain raised above molded body 14 when they are in their usable positions, it is preferred that hex-shaped cutouts (not shown) would be made in the outer surface of molded body 14 during manufacture, that are slightly larger than hex nuts 16, so that each hex nut 16 can be countersunk below the outer surface of molded body 14 while in use.

FIGS. 2A and 2B, respectively, show the inside and outside surfaces of second clamping member 4. FIG. 2A shows second clamping member 4 having a second molded body 18 manufactured as a single unit with three longitudinally extending channels 6 formed into the inside surface of second molded body 18. Two of the channels 6 are upwardly extending, with the third channel 6 extending in an opposed downwardly extending direction. Within each channel 6, FIG. 2A shows two angled teeth 10, two ridges 8, and a interior hollow space 32, with the angled teeth 10 being positioned between interior hollow space 32 and ridge 8, hollow space 32 being within the interior end of channel 6, and ridge 8 being positioned near to the open exterior end of channel 6. Angled teeth 10 are each configured to resist the withdrawal of cord or tubing 28 across ridge 8 and movement beyond the open exterior end of channel 6. Further, when FIGS. 1A and 2A are compared, and as further shown in FIG. 6, it can be seen that the angled teeth 10 and ridges 8 in first clamping member 2 and second clamping member 4 are off-set from one another to better secure cord or tubing 28 therebetween. FIG. 2A also shows seven apertures 12 in spaced-apart positions near to the perimeter of second molded body 18, and one centrally positioned aperture 12 between the two upwardly extending channels 6, each in a position corresponding to a different one of the seven apertures 12 in FIG. 1A. It can be seen in FIG. 2A that apertures 12 are positioned laterally on each side of each of the three ridges 8 that are the closest to the exterior ends of channels 6 to help cord or tubing 28 remain within channel 6 under varying load conditions. FIG. 2B shows the outer surface of second molded body 18 having eight bolts 20 each located in a different position corresponding to one of the apertures shown in FIG. 2A. Although the outer surface of second molded body 18 can be made so that heads of bolts 20 remain raised above the outer surface when they are in their usable positions, it is preferred that round cutouts 34 would be made in the outer surface of second molded body 18 during manufacture that are slightly larger than the heads of bolts 20 so that the head of each bolt 20 can be easily countersunk, if needed, below the outer surface of second molded body 18 and remain there during use.

The first embodiment can be promptly attached to two or more pieces of cord or tubing 28 by placing a selected one of the clamping members 2 or 4 on a flat surface (not shown) or within the palm of the user's hand (not shown). The first selected clamping member 2 or 4 would be positioned so that channels 6 are exposed. The ends of the cords or tubing 28 to be joined would each then be positioned into a different one of the upwardly facing channels 6. When hand-held assembly is used, and while the remaining clamping member 2 or 4 is being aligned for connection to the first selected clamping member 2 or 4, the ends of the cord or tubing 28 ends can be temporarily held in place within their respective channels 6 by the thumb or index finger (not shown) of the hand holding the first selected clamping member 2 or 4. Commonly available threaded fasteners, such as bolts 20 and hex nuts 16, would then be inserted with the aid of small hand tools (not shown) into the apertures 12 adjacent to the channels 6 and ridges 8 in both clamping members 2 and 4, and tightened to firmly fix cords and tubing 28 between clamping members 2 and 4. Removal of the cords or tubing 28 from the present invention locking mechanism is also prompt, and could easily be performed while clamping members 2 and 4 are held in the palm of one hand. The same tool or tools used to insert the threaded fasteners would be used to remove them, after which the top clamping member 2 or 4 would be lifted away from the opposing clamping member 2 or 4 held in the hand. Once the top clamping member 2 or 4 is removed, each piece of cord or tubing 28 could be easily lifted out of the channel 6 into which it had been inserted. Embodiments of the present invention having one-half inch, three-eighths inch, and one-fourth inch diameter channels 6 would probably be commonly available for use, with embodiments having other channel 6 dimensions being manufactured as future applications of the present invention are recognized. It is anticipated that some embodiments of the present invention would contain a single size of channel 6 to join pieces of tubing and cord 28 having a like or similar diameter dimension, while other embodiments would contain one or more channels 6 having a diameter dimension different from the others in the same locking mechanism, for joining pieces of tubing and cord 28 having a different diameter dimension.

FIGS. 3A, 3B, 4A, and 4B show a second preferred embodiment of the present invention locking mechanism, having a first clamping member 22 and an opposing second clamping member 24 used together for a five-way connection of cords and pieces of tubing, such as cord or tubing 28 shown in FIG. 3A, to one another or to itself to form a looped configuration. FIGS. 3A and 3B, respectively, show the inside and outside surfaces of first clamping member 22. FIGS. 4A and 4B, respectively, show the inside and outside surfaces of second clamping member 24. It is also contemplated for commonly available threaded fasteners, such as bolts 20 and hex nuts 16, to be used to connect first clamping member 22 to second clamping member 24 during use of locking mechanism for connection of two, three, four, or five pieces of cord or tubing 28. Although not critical, in the second preferred embodiment it is contemplated for first clamping member 22 and second clamping member 24 to be comparable in size. FIG. 3A shows first clamping member 22 having a molded body 26 manufactured as a single unit, with five longitudinally extending channels 6 formed into the inside surface of molded body 26. Three channels 6 are upwardly extending, with two other channels 6 extending in an opposed downwardly extending direction and approximately parallel to one another, and broken lines in one of the downwardly extending channels 6 illustrating the desired position of a cord or piece of tubing 28 when it is in its usable secured position within channel 6. Within each channel 6, FIG. 3A shows three angled teeth 10, one ridge 8, and a interior hollow space 32, with the angled teeth 10 being positioned between interior hollow space 32 and ridge 8, hollow space 32 being within the interior end of channel 6, ridge 8 being near to the exterior end of channel 6, and the exterior end of each channel 6 being open so that the remainder of cord or tubing 28 can extend beyond channel 6 while its end is secured therein. Angled teeth 10 are each configured to resist the withdrawal of cord or tubing 28 across ridge 8 and movement beyond the open exterior end of channel 6. FIG. 3A also shows nine apertures 12 in spaced-apart positions near to the perimeter of molded body 26, and three centrally positioned apertures 12, two of the centrally positioned apertures 12 being positioned between different upwardly extending channels 6, and the remaining centrally positioned aperture 12 being positioned between the two downwardly extending channels 6. The exact positioning of the central apertures 12 can be varied from that shown, as long as none interferes with the secure connection of cord or tubing 28 within any of the channels 6. It can be seen in FIG. 3A that apertures 12 are positioned laterally on each side of each of the three ridges 8 to assist ridges 8 in tightly fixing pieces of cord or tubing 28 within channel 6. The number of apertures 12 used is not critical, and more than twelve apertures 12 could be used when appropriate to the intended application, as long as there is no undue multiplication thereof without appropriate benefit. A number of apertures 12 less than twelve could also be used for some applications, although use of less than twelve apertures is generally not preferred when the cords or tubing 28 inserted into channels 6 would be subjected to varying load conditions. The number and length of channels 6, the number and width of angled teeth 10, and the number and width of ridges 8 used are also not critical, with the numbers, length, and widths being determined by the appropriateness to the intended application. FIG. 3B shows the outer surface of molded body 26 having twelve hex nuts 16 attached thereto and each secured to the end of a bolt 20. The hex nuts 16 are each located in a different position corresponding to one of the apertures shown in FIG. 3A. Although the outer surface of molded body 26 can be made so that hex nuts 16 remain raised above the outer surface when they are in their usable positions, it is preferred that hex-shaped cutouts (not shown), slightly larger than hex nuts 16, would be made in the outer surface of molded body 26 during manufacture so that hex nuts 16 can be easily countersunk below the outer surface of molded body 26 while in use.

Figure 6:
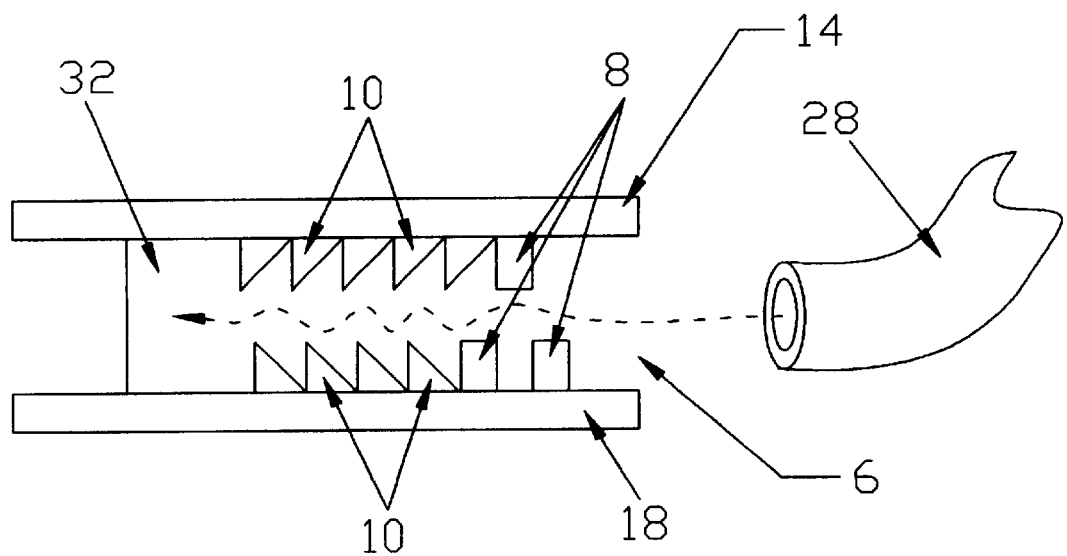
FIG. 6 is a schematic cross-sectional side view of one enclosed tubular passage made from opposing channels in the two clamping members in the first preferred embodiment of the present invention locking mechanism, with a piece of tubing adjacent to the exterior end of the channel and a broken line showing the zigzag positioning the tubing would assume once it is secured within the channel.

FIGS. 4A and 4B, respectively, show the inside and outside surfaces of second clamping member 24. FIG. 4A shows second clamping member 24 having a second molded body 30 manufactured as a single unit, with five longitudinally extending channels 6 formed during manufacture into the inside surface of second molded body 30. Three of the channels 6 are upwardly extending, with two channels 6 extending in an opposed downwardly extending direction. Within each channel 6, FIG. 4A shows two angled teeth 10, two ridges 8, and a interior hollow space 32, with the angled teeth 10 being positioned between interior hollow space 32 and ridge 8, hollow space 32 being within the interior end of channel 6, and ridge 8 being near to the exterior end of channel 6. Angled teeth 10 are each configured to resist the withdrawal of cord or tubing 28 across ridge 8 and movement beyond the open exterior end of channel 6. Further, when FIGS. 3A and 4A are compared, and as also shown in FIG. 6, it can be seen that the angled teeth 10 and ridges 8 in first clamping member 2 and second clamping member 4 are off-set from one another to better secure cord or tubing 28 therebetween. FIG. 4A also shows nine apertures 12 in spaced-apart positions near to the perimeter of second molded body 30, two centrally positioned apertures 12 between different ones of the upwardly extending channels 6, and one centrally positioned aperture 12 between the two downwardly extending channels 6, each in a corresponding position to a different one of the twelve apertures 12 shown in FIG. 3A. It can be seen in FIG. 4A that apertures 12 are positioned laterally on each side of each of the three ridges 8 that are the closest to the open exterior ends of channels 6 so as to best assist ridges 8 in retaining pieces of cord or tubing 28 within channels 6. FIG. 4B shows the outer surface of second molded body 30 having twelve bolts 20 each located in a different position corresponding to one of the apertures shown in FIG. 4A. Although the outer surface of second molded body 30 can be made so that heads of bolts 20 remain raised above the outer surface when they are in their usable positions, it is preferred that round cutouts 34, slightly larger than the heads of bolts 20, would be made during manufacture in the outer surface of second molded body 30 so that the head of bolts 20 can be countersunk below the outer surface of second molded body 30 while in use.

FIG. 5 shows the first embodiment of the present invention locking mechanism being employed in a first tethering device 36 to attach two cords or pieces of tubing, 28a and 28b, in fixed positions relative to one another. FIG. 5 shows both of the ends of cord or tubing 28b attached through the wider end of molded body 14 so that cord or tubing 28b forms a loop. The size of the loop formed is not critical, and loops larger and smaller than that shown are contemplated by the present invention. FIG. 5 also shows one end of a second cord or piece of tubing 28a connected through the opposing more narrow end of molded body 14. Although not shown in FIG. 5, the narrower end of another first embodiment locking mechanism could be attached to the opposing end of cord or tubing 28a, with both of the ends of a third cord or piece of tubing also being connected to the wider end of the second locking mechanism so as to form a second loop. In such a configuration, as is shown in first tethering device 36, cords or tubing 28a and 28b, together with a third cord or tubing (not shown), could be used for many purposes, including the temporary tethering of a pet or other animal, securing movable items in the back of a pick-up truck or on a trailer, and securing a pole supporting a tent or canopy to a stationary object. FIG. 5 further shows the bolts 20 and hex nuts 16 used to securely fix cord or tubing 28a and 28b between molded body 14 and molded body 18 (that is hidden from view in FIG. 5). Although it is critical that cords or tubing 28a and 28b be made from flexible, resilient materials for secure connection by the present invention locking mechanism, cords and tubing 28a and/or 28b may also optionally contain elastic properties.

FIG. 6 shows a cord or piece of tubing 28 near to the open exterior end of the enclosed tubular passage formed between the one of the opposing channels 6 in first molded body 14 and an opposing channel 6 in second molded body 18. Although cord or tubing 28 appears to be poised for entry through the exterior end of channels 6, the preferred method of securing cord or tubing 28 therebetween would be to first select either molded body 14 or second molded body 18 and position it in the palm of one hand (not shown), or place it on a substantially flat surface (not shown), and lay the end of cord or tubing 28 within channel 6 so that its blunt tip extends well into hollow space 32. Thereafter, the remaining molded body 14 or 18 not initially selected for use, would be placed over cord or tubing 28, in a position aligning all apertures 12 therein with the apertures 12 in the initially selected molded body 14 or 18. Thus, when threaded fasteners, such as bolts 20 are inserted through opposing apertures 12 and become secured with hex nuts 16, the cord or tubing 28 between molded bodies 14 and 18 would become securely fixed between tightly gripping angled teeth 10 and ridges 8. A broken line shows the zigzag positioning of cord or tubing 28 once it is secured by the opposing angled teeth 10 and ridges 8 that are off-set from one another. The configuration of angled teeth 10 and ridges 8 shown in FIG. 6 is not critical, and may also include additional gripping surfaces, serrated edges, or arcuate shapes, as long as the configuration used assists in preventing cord or tubing 28 from being easily withdrawn from channel 6. Also, FIG. 6 shows the same number of angled teeth 10 on both molded body 14 and second molded body 18, with each of the angled teeth 10 being off-set from the next 11 adjacent opposed angled teeth 10. While the opposing teeth 10 and ridges 8 in each tubular passage will always be off-set, the number of each is not critical and may vary as long as molded body 14 and second molded body 18 each have at least one ridge 8 and two angled teeth 10.

Figure 8:
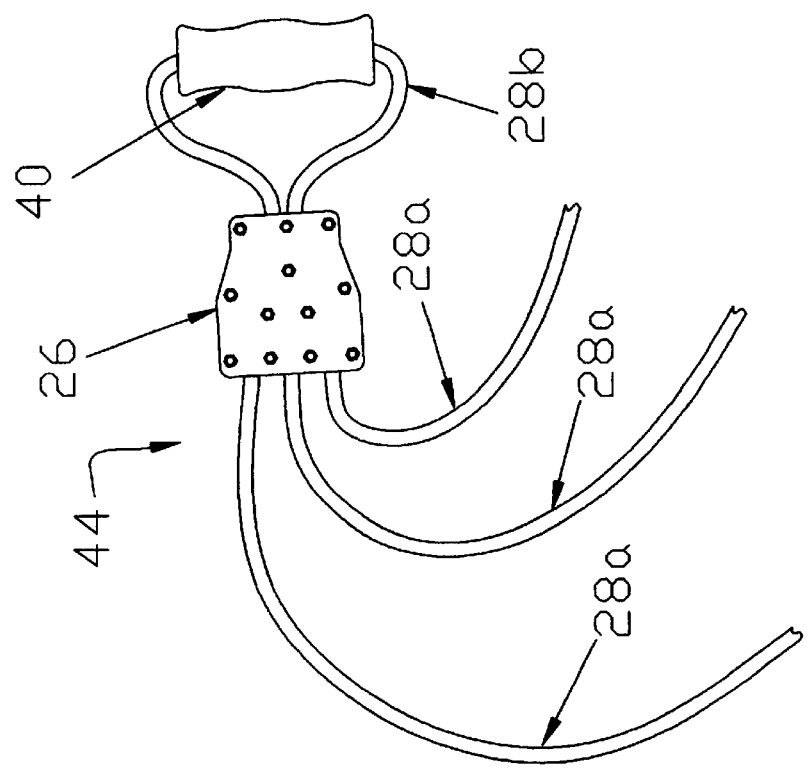
FIG. 8 is a top view of the second preferred embodiment of the present invention locking mechanism being used to form an animal leash for the simultaneous walking or tethering of three small pets, one medium sized pet and one small pet, or a single very large and/or strong pet, the animal leash having at least four cords with one cord being an end cord formed into a looped configuration, a handle attached to the looped cord, and the three remaining end cords free for connection to another locking mechanism or direct connection to a snap bolt or other animal collar attachment device.
Figure 7:
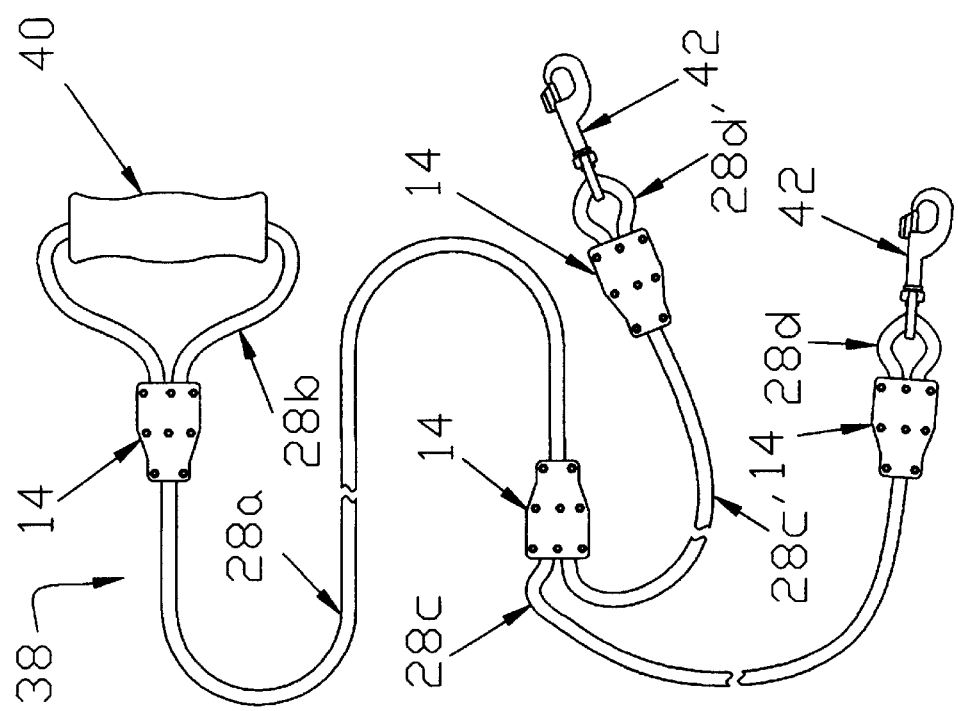
FIG. 7 is a top view of four first preferred embodiments of the present invention locking mechanism being used to form an animal leash for simultaneously walking two pets, in addition to the four locking mechanisms the leash also having six cords with one cord being an elongated middle cord and the three end cords each being formed into a looped configuration, with a handle attached to one of the looped cords, and a snap bolt connected to each of the remaining looped cords.

FIGS. 7 and 8 respectively show additional useful devices 38 and 44, formed by use of the first and second preferred embodiments of the present invention, each potentially being employed for the simultaneous walking or tethering of more than animal. Since many other useful tethering devices can be formed with varying combinations of preferred embodiment locking mechanisms, the scope of the present invention should be determined by the appended claims and their legal equivalents, and not limited only to the examples described herein. FIG. 7 shows four first embodiment locking mechanisms 14 being used to form a second tethering device 38 that can be employed as an animal leash for simultaneously walking two pets (not shown). Second tethering device 38 has six cords 28a, 28b, 28c, 28c', 28d, and 28d', with cord 28b being in a looped configuration and having a sufficient length for supporting a handle 40 configured for use by an adult human hand (not shown), cord 28a being an elongated middle cord, two being intermediate cords 28c and 28c' each being shorter than elongated middle cord 28a, and two short cords 28d and 28d' each being formed into a looped configuration and supporting a snap bolt 42. FIG. 7 also shows four first embodiment locking mechanisms 14 connecting cords 28a, 28b, 28c, 28c', 28d, and 28d' in end-to-end relation. In contrast, and although no pets are shown, FIG. 8 shows one second preferred embodiment locking mechanism being used to form a third tethering device 44 with three cords 28a each with a free end that can be simultaneously employed to walk or tether one large dog, three small pets, or one medium-sized pet and one small pet, with two cords 28a being used to secure the medium-sized pet. It is also possible for third tethering device 44 to be used for walking or tethering only one or two small pets (not shown), with at least one of the cords 28a remaining unused. FIG. 8 also shows third tethering device 44 having a cord 28b being formed into a loop of sufficient length for supporting a handle 40 configured for an adult human hand (not shown). The three cords 28a can be each connected to another locking mechanism or direct connection to a snap bolt 42, as shown in FIGS. 7, or other animal collar attachment device (not shown). FIG. 8 also shows the first half 26 of the second preferred embodiment of the locking mechanism of the present invention that connects cord 28b to cords 28a in end-to-end relation. First half 26 is configured for connection of four cords, with cord 28b being formed into a looped configuration and extending from the narrower end of first half 26, and one end of each of the three cords 28a extending from the opposing wider end of first half 26. The second end of each cord 28a remains free for connection to another locking mechanism, such as one made from first half 14 and second half 18, or direct connection to a snap bolt 42, as shown in FIG. 7, or other animal collar attachment device (not shown).

Although the dimensions of components in the present invention could vary and should not be limited hereto, the following dimensions are used as an example of the comparative dimensions found in one of the preferred embodiments of the present invention. When molded body 14 or 18 would have an elongated octagonal configuration with a maximum width dimension of approximately one-and-one-half inches and a length dimension of approximately two-and-three-eights inches, each channel 6 would have a length dimension of approximately one-and-one-fourth inches and a diameter dimension of approximately of three-eighths of an inch. In addition, the spaced-apart distances between angled teeth 10 would be approximately one-eighth of an inch, with the length dimension of interior hollow space 32 being approximately three-eighths of an inch. Although not critical, it would be expected for ridges 8 to extend the full width of channels 6. Also, the thickness dimension of ridges 8 could vary, and even the three ridges 8 within the first preferred embodiment could all have the same thickness dimension, as shown in FIGS. 1A and 2A, or varying width dimensions (not shown). However, in the given example above, it would be expected for each ridge 8 to have a maximum thickness dimension of approximately one-eighth of an inch. Further, when fastener cutouts, such as round cutouts 34 for bolts 20, are present within molded body 18 or second molded body 30, it would be expected for assembly of molded body 18 to molded body 14 and second molded body 30 to second molded body 26 to take place with molded body 18 and second molded body 30, respectively, positioned over molded body 14 and second molded body 26 so that access for a hand tool can be provided to the heads of bolts 20 for threaded insertion of bolts 20 into apertures 12.

What is claimed is:

1. A two-part locking mechanism that can be used as a clamping device to secure the ends of resilient cords and tubing to one another in end-to-end working relation, said locking mechanism comprising:

a first clamping member having a plurality of channels each with a plurality of spaced-apart angled teeth and at least one ridge, and a plurality of apertures each configured to receive a threaded fastener;

a second clamping member having an identical number of said channels each with a plurality of spaced-apart angled teeth and at least one ridge, each said channel being in a position opposed to a different one of said channels in said first clamping member, and each of said angled teeth and each said ridge in said second clamping member being off-set from those of said angled teeth and each said ridge in the one of said channels opposing it in said first clamping member, said second clamping member also having a number of apertures configured to receive a threaded fastener that is identical to the number of said apertures in said first clamping member; and a number of threaded fasteners identical to the number of said apertures in said first clamping member so that when said first clamping member and said second clamping member are positioned facing one another with opposing ones of said channels aligned with each pair of opposing channels forming a tubular passage, and a flexible cord or piece of tubing is positioned within and substantially filling at least one of said tubular passages, and further when said threaded fasteners are each tightened through a different one of said apertures to securely connect said first clamping member to said second clamping member, each such flexible cord or piece of tubing thus secured will remain securely fixed within said tubular passage until deliberately released, even when the cord or tubing is subjected to sudden, unexpected, and substantial withdrawing forces.

2. The locking mechanism of claim 1 wherein said channels each have an open exterior end and at least one said ridge positioned adjacent to said open exterior end.

3. The locking mechanism of claim 1 wherein said channels each have a closed interior end and each piece of flexible tubing or cord has a blunt end, and wherein each said closed interior end has a hollow space configured for receipt of the blunt end.

4. The locking mechanism of claim 1 wherein said first and second clamping members are each made of a unitary construction from rigid, impact resistant plastic.

5. The locking mechanism of claim 1 wherein said first and second clamping members each have approximately the same thickness dimension.

6. The locking mechanism of claim 1 wherein said threaded fasteners are selected from a group consisting of easily assembled and released threaded fasteners; bolts and nuts; and bolts and hex nuts.

7. The locking mechanism of claim 1 wherein some of said apertures are perimeter apertures, and two of said perimeter apertures are positioned adjacent to each said ridge.

8. The locking mechanism of claim 1 wherein said clamping members are configured for countersunk positioning of said threaded fasteners.

9. A two-part locking mechanism that can be used as a clamping device to secure the ends of resilient cords and tubing to one another in end-to-end working relation, said locking mechanism comprising:

a first clamping member having a plurality of channels each with a closed interior end and an open exterior end, each of said channels also having a plurality of spaced-apart angled teeth and at least one ridge, each said ridge being positioned between said angled teeth and said exterior end, said first clamping member also having a plurality of apertures therethrough each configured to receive a threaded fastener;

a second clamping member having an identical number of said channels each with a closed interior end and an open exterior end, each said channel being in a position opposed to a different one of said channels in said first clamping member, each of said channels in said second clamping member also having a plurality of spaced-apart angled teeth and at least one ridge, each said ridge being positioned between said angled teeth and said exterior end, and each of said angled teeth and each said ridge in said second clamping member being off-set from those of said angled teeth and each said ridge in the opposing channel in said first clamping member, said second clamping member also having a number of apertures each configured to receive a threaded fastener that is identical to the number of said apertures in said first clamping member; and a number of threaded fasteners identical to the number of said apertures in said first clamping member so that when said first clamping member and said second clamping member are positioned facing one another with opposing ones of said channels aligned with each pair of opposing channels forming a tubular passage, and a flexible cord or piece of tubing is positioned within and substantially filling at least one of said tubular passages, and further when said threaded fasteners are each tightened through a different one of said apertures to connect said first clamping member to said second clamping member, each such piece of flexible cord or tubing thus secured will remain fixed within said tubular passage until deliberately released, even when the cord or tubing is subjected to sudden, unexpected, and substantial withdrawing forces.

10. The locking mechanism of claim 9 wherein said first and second clamping members are each made of unitary construction from rigid, impact resistant plastic materials.

11. The locking mechanism of claim 9 wherein said first and second clamping members each have approximately the same thickness dimension.

12. The locking mechanism of claim 9 wherein said threaded fasteners are selected from a group consisting of easily assembled and released threaded fasteners; bolts and nuts; and bolts and hex nuts.

13. The locking mechanism of claim 9 wherein some of said apertures are perimeter apertures, and two of said perimeter apertures are positioned adjacent to each said ridge.

14. The locking mechanism of claim 9 wherein said clamping members are configured for countersunk positioning of said threaded fasteners.

15. A method of securing the ends of resilient cords, rope, and tubing to one another in end-to-end relation and maintaining said ends in a fixed relation to one another even when said ends are subjected to sudden, unexpected, and substantial withdrawing forces, said method comprising the steps of:

providing a plurality of pieces of flexible cord, rope, and tubing;

also providing a plurality of easily assembled and released threaded fasteners;

further providing a plurality of two-part locking mechanisms each having two paired clamping members, with each said clamping member having a plurality of channels and an identical number of apertures each configured to receive one of said threaded fasteners, with each said channel having an interior hollow space, a plurality of spaced-apart angled teeth, and at least one ridge, each said channel also being configured for alignment and pairing with an opposing channel to form a tubular passage, said angled teeth and each said ridge in said opposing channels being off-set from one another;

selecting a first piece of flexible cord, rope, or tubing, and a second piece of flexible cord, rope, or tubing needed for use in a fixed end-to-end relation relative to one another, each of said pieces having opposing ends;

selecting a locking mechanism wherein one of said opposing ends of said first piece of flexible cord, rope, or tubing will substantially fill a first one of said tubular passages, and one of said ends of said second piece of cord, rope, or tubing will substantially fill a second one of said tubular passages;

separating said two paired clamping members in said first selected locking mechanism;

selecting a first one of said paired clamping members;

placing said first paired clamping member so that said channels in said first paired clamping member are exposed;

extending one of said opposed ends of said first piece of flexible cord, rope, or tubing longitudinally within the one of said channels in which said extended opposing end of said first piece lays substantially across said interior hollow space, said angled teeth, and each said ridge formed within said channel;

extending one of said opposed ends of said second piece of flexible cord, rope, or tubing longitudinally within the one of said channels in which said extended opposing end of said second piece lays substantially across said interior hollow space, said angled teeth, and each said ridge formed within said channel;

repeating said steps of selecting and extending different ones of said pieces of flexible cord, rope, and tubing until all of said needed channels are substantially filled by a different one of said pieces of flexible cord, rope, and tubing;

aligning said second paired clamping member so that said channels in said second paired clamping member in combination with said channels in said first paired clamping member form one of said tubular passages around each of said selected and extended pieces of flexible cord, rope, and tubing positioned therebetween;

inserting one of said threaded fasteners through each of said apertures in said first paired clamping members;

tightening each of said inserted fasteners to firmly secure said selected and extended pieces of flexible cord, rope, and tubing between said first paired clamping members;

repeating said steps of selecting additional ones of said locking mechanisms and additional ones of said pieces of flexible cord, rope, and tubing; and also repeating said steps of placing, extending, aligning, inserting and tightening until all of said opposing ends of said selected pieces of flexible cord, rope, and tubing needed for use are firmly secured between said paired clamping members in at least one of said locking mechanisms.

16. The method of claim 15 wherein said threaded fasteners are selected from a group consisting of easily assembled and released threaded fasteners; bolts and nuts; and bolts and hex nuts.

17. The method of claim 15 wherein said step of tightening said threaded fasteners further comprises the tightening of two of said threaded fasteners adjacent to each said ridge.

18. The method of claim 15 wherein said clamping members are configured for countersunk positioning of said threaded fasteners.

19. The method of claim 15 wherein each of said clamping members is made of unitary construction from rigid, impact resistant plastic materials.

20. The method of claim 15 wherein both of said paired clamping members in each of said locking mechanisms have a substantially identical thickness dimension.

* * * * *